US009209947B1

(12) United States Patent
Cousins

(10) Patent No.: US 9,209,947 B1
(45) Date of Patent: Dec. 8, 2015

(54) FAULT-TOLERANT DATA TRANSMISSION SYSTEM FOR NETWORKS SUBJECT TO JAMMING CONDITIONS

(71) Applicant: Saratoga Data Systems, Inc., Saratoga Springs, NY (US)

(72) Inventor: Robert Cousins, Saratoga, CA (US)

(73) Assignee: Saratoga Data Systems, Inc., Saratoga Springs, NY (US)

( * ) Notice: Subject to any disclaimer, the term of this patent is extended or adjusted under 35 U.S.C. 154(b) by 13 days.

(21) Appl. No.: 14/160,320

(22) Filed: Jan. 21, 2014

(51) Int. Cl.
*H04L 1/18* (2006.01)

(52) U.S. Cl.
CPC ............... *H04L 1/189* (2013.01); *H04L 1/188* (2013.01); *H04L 1/1816* (2013.01); *H04L 1/1819* (2013.01); *H04L 1/1822* (2013.01); *H04L 1/1896* (2013.01)

(58) Field of Classification Search
CPC ..... H04L 1/1812; H04L 1/1822; H04L 1/188; H04L 1/1887; H04L 1/0009; H04L 1/1816; H04L 1/1819; H04L 1/18; H04L 1/1896
USPC .......................................................... 714/749
See application file for complete search history.

(56) References Cited

U.S. PATENT DOCUMENTS

| 7,372,400 | B2 | 5/2008 | Cohen et al. | |
|---|---|---|---|---|
| 7,502,818 | B2 * | 3/2009 | Kohno et al. | 709/203 |
| 7,966,541 | B2 * | 6/2011 | Fan et al. | 714/749 |
| 8,078,944 | B2 | 12/2011 | Cousins | |
| 8,102,801 | B2 * | 1/2012 | Kwak | 370/328 |
| 8,151,156 | B2 * | 4/2012 | Lee et al. | 714/749 |
| 8,205,128 | B2 * | 6/2012 | Yoo et al. | 714/748 |
| 8,310,920 | B2 | 11/2012 | Goldfein et al. | |
| 8,321,740 | B2 * | 11/2012 | Kuo | 714/748 |
| 8,332,702 | B2 * | 12/2012 | Pinheiro et al. | 714/748 |
| 8,332,708 | B2 * | 12/2012 | Nagaraja | 714/748 |
| 8,464,127 | B2 * | 6/2013 | Kim et al. | 714/758 |
| 8,472,448 | B2 * | 6/2013 | Yin | 370/394 |
| 2003/0023746 | A1 * | 1/2003 | Loguinov | 709/235 |
| 2003/0126238 | A1 * | 7/2003 | Kohno et al. | 709/220 |
| 2004/0010743 | A1 * | 1/2004 | Lee et al. | 714/748 |
| 2008/0215948 | A1 * | 9/2008 | Pinheiro et al. | 714/748 |
| 2009/0249158 | A1 * | 10/2009 | Noh et al. | 714/750 |

(Continued)

OTHER PUBLICATIONS

Paper: J.S. Plank, "Optimizing Cauchy Read-Solomon Codes for Fault-Tolerant Storage Applications", Univ. of Tennessee, Dept. of Computer Science, Knoxville, TN, Dec. 2005, 11 pages.

(Continued)

*Primary Examiner* — James C Kerveros
(74) *Attorney, Agent, or Firm* — Thomas Schneck

(57) ABSTRACT

A method and system are provided for data transfer in a network where jamming conditions may occur. A sender at a first endpoint of the network includes a processor that implements fault-tolerant coding of cohorts of original datagrams that are converted into corresponding chapters of transformed datagrams such that the original datagrams are recovered by a receiver at a second endpoint of the network from a subset of the transformed datagrams of each chapter transferred over the network. In the presence of jamming, chapter size and redundancy of the coding are adjusted according to the level of jamming to enable datagram recovery with a minimum of resending over the network. The sending rate may also be tuned in reaction to changing network conditions based on messages from the receiver on a separate feedback channel to keep datagram loss rates below a specified upper bound.

6 Claims, 2 Drawing Sheets

(56) References Cited

U.S. PATENT DOCUMENTS

| | | |
|---|---|---|
| 2009/0310554 A1 | 12/2009 | Sun et al. |
| 2010/0005358 A1* | 1/2010 | Lim et al. ............... 714/749 |
| 2010/0099431 A1 | 4/2010 | Sampath et al. |
| 2010/0153803 A1* | 6/2010 | Harada et al. ............ 714/748 |
| 2010/0185910 A1* | 7/2010 | Lee et al. ............... 714/748 |
| 2010/0251056 A1* | 9/2010 | Dinan ................... 714/749 |
| 2010/0313095 A1* | 12/2010 | Dinan ................... 714/749 |

OTHER PUBLICATIONS

Paper: J.S. Plank, "A Tutorial on Reed-Solomon Coding for Fault-Tolerance in RAID-like Systems", Univ. of Tennessee, Dept. of Computer Science, Feb. 19, 1999, 20 pages.

Paper: J.S. Plank et al., "Note: Correction to the 1997 Tutorial on Reed-Solomon Coding", Univ. of Tennessee, Dept. of Computer Science, Tech. Report UT-CS-03-504, Apr. 24, 2003, 6 pages.

* cited by examiner

FAULT-TOLERANT DATA TRANSMISSION SYSTEM FOR NETWORKS SUBJECT TO JAMMING CONDITIONS

TECHNICAL FIELD

The present invention relates to data transfers between sending and receiving devices in a networked environment where Reed-Solomon or other fault tolerant coding is used to generate chapters of encoded datagrams that allow recovery or reconstruction of lost datagrams, and in particular to such transfers where the underlying transport may be subject to jamming of the data transfer.

BACKGROUND ART

Packet switched or network communications can be subject to conditions where data transfer may be jammed by some source. This is true, for example, of wireless networks in which a radio jamming device may be used to send out a strong noise signal at one or more radio frequencies used by a network so as to hinder or prevent communication between a sender and/or receiver unit and one or more nodes (e.g. cellular towers) of a network. The legality of jamming depends upon the jurisdiction and such factors as whether it is being carried out by a public authority or a civilian organization or person, the specific purpose of the jamming, and the location where the jamming occurs (e.g. within a prison, hospital, school, church, theatre or privately owned building). However, from the standpoint of a user of the network, an effort will be made to thwart any jamming that may be present in order to achieve successful communication.

From the standpoint of a program using the internet protocol suite (TCP/IP) and similar network protocols, jamming appears to be dropped packets or datagrams and some additional corruption of the data during transfer. Many existing communications protocols like TCP/IP already suffer from transfer rate limitations due to network latency, traffic congestion and dropped datagrams or packets. The existence of jamming tends to worsen the problem of dropped datagrams or packets as well as losses due to data corruption, and thus slows the effective transfer of data over the network.

In U.S. Pat. No. 8,310,920 to Goldfein et al., a system and method are disclosed that accelerate data transfers over a network even in the face of high latency and congestion. The sender will send as much data as it can as rapidly as possible so as to make maximum use of the available bandwidth. This is in contrast to any specific amount of bandwidth that the network or any of the network's nodes might attempt to allocate to any given sender. The sender sends datagrams continuously (with only small amounts of inter-datagram delay between contiguous datagrams) until the source of data is exhausted or until the sender is paused by the receiver. The sender thereby floods the transmission channel with traffic, taking all available bandwidth, with the aim of keeping the channel as full of data as possible so that there is always data ready for immediate acceptance by the receiver, even if the extra burden results in some dropped data that must subsequently be resent. In one embodiment, the '920 patent describes a protocol that employs fault-tolerant coding of chapters of datagrams, such as Reed-Solomon or similar error-correcting codes, to build in a level of redundancy in each encoded chapter, so that any lost (missing or corrupt) datagrams in a chapter, up to a specified loss rate, can be recovered from those encoded datagrams that do successfully arrive at the receiver end. This ability to reconstruct missing datagrams from a subset of encoded datagrams of a chapter minimizes the need for resending datagrams.

In addition to the data transmission channel, a separate feedback channel is also established between sender and receiver for reporting of synchronization messages (SYNs), acknowledgement messages (ACKs) and negative acknowledgments (NAKs) by the receiver, so the sender can determine network latency and the existence of any lost or corrupted datagrams that need to be resent. Periodic SYNs, as well as ACKs that supplement, replace or incorporate such SYNs once data transmission has begun, include a timestamp, and changes in timestamp differences are used by the sender as a measure of overall latency and network congestion to serve as one basis for tuning the data transmission rate. The sender tries to optimize the use of the available bandwidth capacity as defined by the bandwidth delay product. An optimum rate is defined as the highest rate the data can be transmitted and be successfully received and processed by the receiver with minimum data loss. The content of NAKs and ACKs allow the sender to determine the datagram loss rate in the data channel to serve as another basis for tuning the data transmission rate. Too little loss (or corruption) implies that datagrams can be sent more frequently, while too much loss results in too much retransmission. Hence an optimum data rate can be maintained by the sender setting an upper bound to the datagram loss rate.

The '920 patent's error-correcting-capable protocol makes use of a method described in U.S. Pat. No. 8,078,944 to Cousins which involves transforming groups of datagrams, called cohorts, using Galois field operations and a Vandermonde generator matrix to derive corresponding groups of output datagrams, called chapters, that have sufficient redundancy embedded within the reformulated data so that original data is recoverable even when less than all elements of a chapter are available. Specifically, when a cohort of W input datagrams are transformed into a chapter of H output datagrams, where H≥W, then all W original datagram files are recoverable from only W received datagrams of a chapter. Thus, provided not more than (H−W) datagrams of a chapter are lost or corrupted during transmission, the entire cohort of original data will be recovered. However, if the datagram loss rate is great enough such that fewer then W datagrams of a chapter are available, then none of the original data, not even small portions, will be recoverable.

In spite of the overall improvement in data transfer provided by the '920 patent's error-correcting-capable protocol, the possible existence of jamming conditions invites further enhancements to take account of the increase in data corruption and datagram loss rates that could otherwise prevent or delay datagram recovery by the receiver and add to the required buffering overhead.

SUMMARY DISCLOSURE

A network transmission system can optimize data transfer rates if the sender recognizes or is informed of the existence of any jamming condition in the established data channel. Using that information, the sender will send groups of datagrams in smaller chapters whose size corresponds to the presence and/or degree of jamming. Accordingly, a method is provided for transferring data between a sender and a receiver in a datagram-based network where jamming can occur.

The method begins by establishing separate data and feedback channels over the network between the sender and the receiver.

A processor implementing fault-tolerant coding divides a data set to be transmitted into cohorts of datagrams and converts each cohort of H original datagrams into corresponding chapters of W transformed datagrams, where W is greater than or equal to H. The conversion is such that a complete cohort of original datagrams is recoverable from any subset of at least H of the transformed datagrams that have been derived from that particular cohort.

The chapters of transformed datagrams are sent over the data channel from the sender to the receiver until a source of data is exhausted or paused by the receiver. The chapter size (W) and redundancy (W/H) corresponds to the presence or absence of a jamming condition and preferably also to a determined amount or degree of jamming, where smaller chapters or greater redundancy or both correspond to increased jamming.

The encoded chapters of datagrams allow the receiver to reconstruct complete cohorts of original datagrams even when only a subset of the transformed datagrams from a corresponding chapter successfully arrives at the receiver. Moreover, even where an insufficient number of datagrams from a chapter to allow recovery of the chapter have been received, a full set of the missing datagrams need not be resent, but only enough to reach the minimum needed to reconstruct the chapter. Thus, resending of datagrams is minimized.

The receiver sends messages over the (receiver) feedback channel to the sender. The messages acknowledge those cohorts of original datagrams that have been successfully reconstructed, and also, whenever a cohort cannot be recovered, identify the missing or corrupt datagrams from any missing or incomplete chapters. At least some messages further include timing information indicative of network latency and congestion. Based on the messages obtained over the receiver feedback channel, the sender will resend at least a specified number of datagrams over the data channel from the missing or incomplete chapters sufficient to allow cohort recovery.

The sender also self-tunes the sending or transmission rate of the chapters of datagrams, as well as the chapter size and redundancy in reaction to changing network conditions. The self-tuning will be based upon a combination of information about the presence of a jamming condition, network latency and datagram loss rate, as determined from the content of messages received over the feedback channels. The self-tuning is adapted to at least keep the datagram loss rate below a specified upper bound.

DETAILED DESCRIPTION

Figure 1:
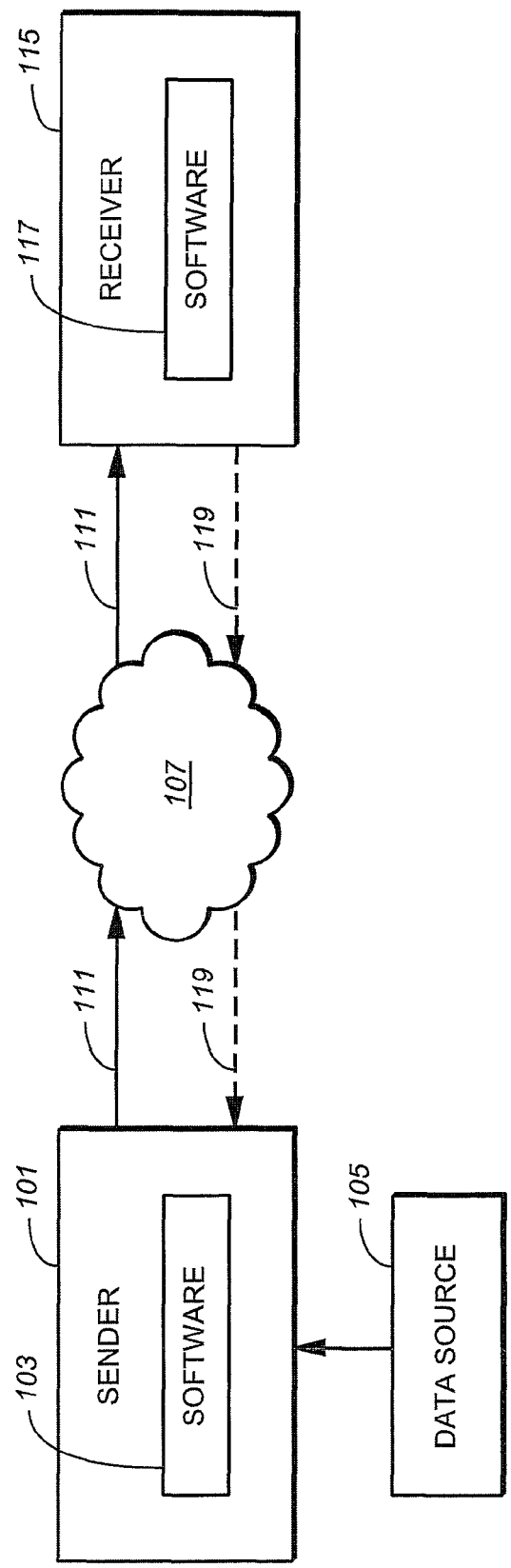
FIG. 1 is a schematic block diagram illustrating typical components of a data transmission system that forms both the context and basic elements of the present invention.

With reference to FIG. 1, a data transmission system couples a sender 101 to a receiver 115 for data transfer over a network 107, 111 and 117. Sender 101 and receiver 115 have software, 103 and 117 respectively, loaded on their computer hardware for implementing a data transfer protocol in accord with the present invention. The sender 101 has access to a data source 105 storing data that may be transferred over the network in response to a request from the receiver 115. A data channel 111 is established between the sender 101 and receiver 115 over some available pathway 107 of the network.

In addition to a data channel 111, a separate feedback channel 119 is established between the receiver 115 and sender 101. The feedback channel 119 may use either the same or a different pathway of the network as the data channel.

From the standpoint of a program using the TCP/IP protocol suite, jamming appears to be packet drops and some additional packet corruption. Under conditions where a sender is operating under an aggressive transfer protocol, such as that which is described in the aforementioned U.S. Pat. No. 8,310,920, it may be difficult for the sender to self-tune the data sending rate to keep loss of datagrams below a specified rate under jamming conditions. Datagram losses are largely independent of sending rate under such conditions. Jamming will therefore make transferring a full chapter of data more difficult.

Accordingly, the aggressive error-correcting-capable data transfer protocol is here modified and extended to better function in the specific environment where jamming is present. Specific enhancements to the current error-correcting-capable protocol optimize effective transmission rates under jamming conditions in several different ways, including by setting and adjusting chapter size and redundancy for the transmitted chapters of datagrams. In particular, in response to the presence of jamming we can (1) shrink the chapter size (fewer datagrams), (2) increase the redundancy pool (which may require shifting from 8-bit codes to 16-bit codes), or both. Chapter size and redundancy may not only be determined by the presence or absence of jamming conditions in the established data channel in the network, but also according to the level or degree of any such jamming that may be determined to be present. These modifications and extensions allow a sender 101 to work around the prevalence of datagram losses to permit the recovery of entire chapters of datagrams in spite of the jamming losses. Use and optimization of the forward error correction allows a sender unit to transport data in certain applications where it would be otherwise difficult in practice. These modifications make the protocol more powerful in the face of substantially higher packet drops and corruption. However, we do not anticipate a substantial latency change for the channel. An automatic requirement should be to turn on the best lossless compression to minimize the number of datagrams to be transferred.

The sender recognizes that it is in a 'jamming' situation either by user input or by determining that the drop/corruption rate exceeds some threshold. Tuning of the chapter size and redundancy pool can be under the control of PID or other feedback-based algorithm (optionally with user input). We treat the chapter size and pool increase as independent concepts. Chapter size change is a function of several variables: (1) throughput after jamming; (2) receiver CPU power (smaller CPUs work better with smaller chapter sizes); (3) transmitter CPU power (smaller CPUs work better with smaller chapter sizes); (4) receiver memory (fewer chapters with fewer datagrams require less buffering); and (5) whether transmission of additional redundant datagrams will allow chapters through cleanly. Pool size change is also a function of several variables: (1) chapter size (if you shrink the chapter, the pool can probably be reduced too); (2) probability that all datagrams will be required to transfer a chapter (tied to signal/noise ratio); and (3) transmitter CPU power (larger pool requires more transmitter memory and CPU). The PID model must be viewed as a multi-dimensional differential equation with coefficients for each dimension.

Further modifications in the face of jamming can include use of hierarchical codes, wherein cohorts of datagrams to be encoded are split into halves for the transformation operation, with three classes of redundancy: first half, second half, and an overall chapter. Similar subdivisions are possible at all scales from single datagrams to entire file transfers. In essence, this shifts the forward-error correction encoding from being specifically tied to a chapter to one where it supports redundancy at ever smaller units.

A similar concept is to use 'walking codes' having overlapping redundancy rather than rigorous blocks. In the 'walking code' technique, the redundant information is calculated over regions with overlaps. If value 'a' spans datagrams 0 . . . n, then 'b' spans datagrams k . . . n+k, etc. (k<n) This would essentially make chapters obsolete.

Advantages to the use of either hierarchical or walking codes, in spite of the increase in the amount total bits needed to be transmitted to handle accommodate the extra redundancy, become apparent in situations where network latency is large and the information is real-time critical (as in VoIP) and any retransmission of lost or corrupted datagrams is therefore essentially useless. In such situations, the transmitted information must be recoverable by the receiver on the first pass or else will be permanently lost. The hierarchical or walking codes permit such recovery from the received "chapters" even in the face of heavy jamming. If one full chapter is unrecoverable, at least the half-chapters may still be recoverable, or in the case of walking codes, the affected datagrams may still be recovered from the next overlapping "chapter".

Because jamming results not only in the loss of datagrams, but can also corrupt the datagrams that are eventually received and recovered, a verification of the recovered contents can be very important. In addition to the use of hash schemes, such as SHA256/128, or in lieu thereof, additional recovery data may be incorporated into the transmission of encoded chapters to verify the contents of the recovered datagrams, and even provide some error correction.

The receiver units in the network system may cache recovery models to reduce the computation required to recover one chapter to another. A recovery model is the set of equations and Galois arithmetic tables associated with recovering data. For example, if a receiver receives datagrams 0.63 (no loss), the data is still encoded. By taking the generating matrix's first 64 rows and inverting it (using Galois arithmetic), the resultant matrix is the recovery matrix. Then a set of cheat tables are created from these coefficients to enable very high speed calculation of results.

The act of inverting the matrix and generating the cheat tables can be quite time consuming. However, different sets of datagrams will require different recovery models. For example, if the 2nd datagram was lost and the 64th was inserted, a totally new recovery model would be required. However, the most common packet loss scenarios should involve only a subset of all possible 'n' datagram loss scenarios. In other words, only ten or twenty recovery models may be enough for half or more of the chapters. In this case, we can keep the recovery models around in a cache rather than simply rebuilding it from scratch with each chapter. An algorithm for this is to declare a bit vector (think 2 64-bit integers to make a 128-bit vector), setting the bits corresponding to received datagrams. One could then compare the bit vector for each existing recovery model with the bit vector for a chapter by XORing the two vectors together. If the result is zero, then the model will recover for the chapter. However, there is also the possibility that the chapter will have additional datagrams which will cause too many bits to be set, which would then cause the simple XOR test to fail. So the per-bit equation should instead be controlled by the truth table below:

|  | Recovery Model | |
|---|---|---|
|  | 0 | 1 |
| Received Chapter 0 | 0 | 1 |
| 1 | 0 | 0 |

When applied to the resulting vector, the population count of the result should equal zero.

Chapter Size Optimizations

A first extension is to control the size of chapters (both number of datagrams and the size of datagrams) to allow it to work in greater harmony with the underlying transport equipment. Initial datagram size is determined by channel maximum transmission unit (MTU) which may be a parameter of the network, assuming the absence of any jamming. One implementation always uses a 64×128 matrix when initializing the chapter size.

In order to understand the relationship between optimum chapter size and the characteristics of the network's data transport and the presence of any jamming, as well as the relationship between datagram loss rates and the chapter size W and chapter/cohort size ratio (W/H), we start with the assumption that the data channel is latency bound, meaning that the bandwidth delay product is such that a short message takes longer to travel between the sender and receiver units than simply defined by the bit rate of the connection. (In other words, it is possible to have data 'stored' in the channel.)

Starting with the extreme case wherein the sending unit transmits exactly one datagram (which should eventually arrive at the receiver unit) and waits for an acknowledgement message, when the round trip latency is bounded the sending unit will receive either an acknowledgment (ACK) message, a negative acknowledgment (NAK) or will timeout. The throughput in this extreme case is very poor. Increasing the transmit size to a group of two datagrams, the throughput essentially doubles but is still poor, with the majority of time being spent with no, bits being transmitted due to the channel being latency bound. Much potential transfer capacity is going unused. Increasing the number of datagrams in the chapter to a transmit size of n before awaiting a reply results in a throughput that is n times that of the single datagram case, until one or more of the buffers of the various nodes in the network data pathway become full and begin dropping datagrams. For some value of n a network node's buffer becomes full with n−1 datagrams, forcing the last or $n^{th}$ datagram to be dropped. At this point our example system implementing a simplistic protocol breaks down, wherein the dropping of just a single datagram results in a timeout forcing the sending unit to retransmit the chapter of n datagrams endlessly.

Shifting now to a 'chapters' transmission model wherein the receiver unit reports the number of datagrams received after a suitable idle period (which in this case indicates either that the chapter has been transmitted in total or that some additional number of datagrams are required for chapter recovery), we choose a chapter size n that is comfortably contained in each network buffer and then again increase the chapter size to the point where some node in the network begins to drop datagrams. The receiver's acknowledgement of m datagrams received causes the sender to simply retransmit the n−m datagrams identified as missing (or at least a subset of the same needed for the recovery of the original cohort of datagrams). As the chapter size n increases, the amount of buffering memory in the sender and receiver units increases and the number of lost datagrams needing to be retransmitted through the network also increases, but the rest of the system is largely unchanged. Note that even in the case of some datagrams being dropped by the transmit gateway and associated inefficiencies, the actual throughput of the system is at or near maximum and essentially the same as for that value of n where no datagrams are dropped.

We now introduce jamming into the network, which is represented by a randomized datagram loss over the network data channel and call the loss rate r, where this loss rate is the probability that a given datagram reaches the other end (zero for no loss increasing to one for total loss). For this discussion, we assume corrupted datagrams are discarded at the receiving entity (either the receiving gateway or the endpoint receiver unit) and so can be treated as equivalent to lost datagrams. Also, we assume that the particular location in the network where jamming occurs is irrelevant. To this point, we've had r=0. Now set r=1/n, where n is the chapter size such that the network is not dropping any datagrams. In this situation, an average of one of the chapter's datagrams is lost before the receiver unit actually receives the chapter. The receiver unit acknowledges receipt of n−1 datagrams, identifies the lost datagram needing to be retransmitted, and the protocol therefor operates in a mode similar to when n is one past the size where no datagrams are lost. However, here the overall throughput of the channel is now proportional to (n−1)/n since the network itself is consuming n transmit slots, but the receiver unit is only processing n−1 received datagrams. The problem cannot simply be rectified by increasing the chapter size n, due to network limitations. However, if the chapter/cohort size ratio (W/H) is increased to at least n/(n−1), so that the receiver unit can still recover a complete chapter in spite of the projected single datagram loss per chapter, throughput is now improved because each chapter is processed in one transmit tenure.

A system employing this scheme for setting chapter size and chapter/cohort ratio operates in a much more efficient regime and requires fewer internal resources in the sender and receiver units. Because the receiver unit is able to successfully process entire chapters per transmission tenure, it no longer needs to buffer datagrams while waiting for missing datagrams to arrive in a subsequent transmit period. Likewise, the sending unit's redundant pool of sent datagrams can be emptied of a chapter's datagrams earlier, as an positive acknowledgment (ACK) message will be sent to the sender during the immediately following back haul period.

As the datagram loss rate r over the data channel grows toward 2/n, the optimal throughput will demand a corresponding increasing chapter/cohort size ratio, to n/(n−2) so as to be able to handle an average loss of two datagrams per chapter while still being able to recover a complete cohort from the datagrams that do arrive at the receiver unit. The shrinking cohort size from which the chapters of datagrams are derived is an acceptance of a lower peak throughput over the channel, but it also corresponds to achieving throughput which is near the new, lower optimal value.

Accordingly, chapter size n is chosen to avoid dropping of datagrams by the transmit gateway, while the amount of redundancy contained in a chapter, represented by the chapter/cohort size ratio (W/H), is chosen to be at least n/(n−nr) =1/(1−r), where r is the datagram loss rate over the data channel, so that complete cohorts can be successfully recovered in spite of the expected datagram losses.

Figure 2:
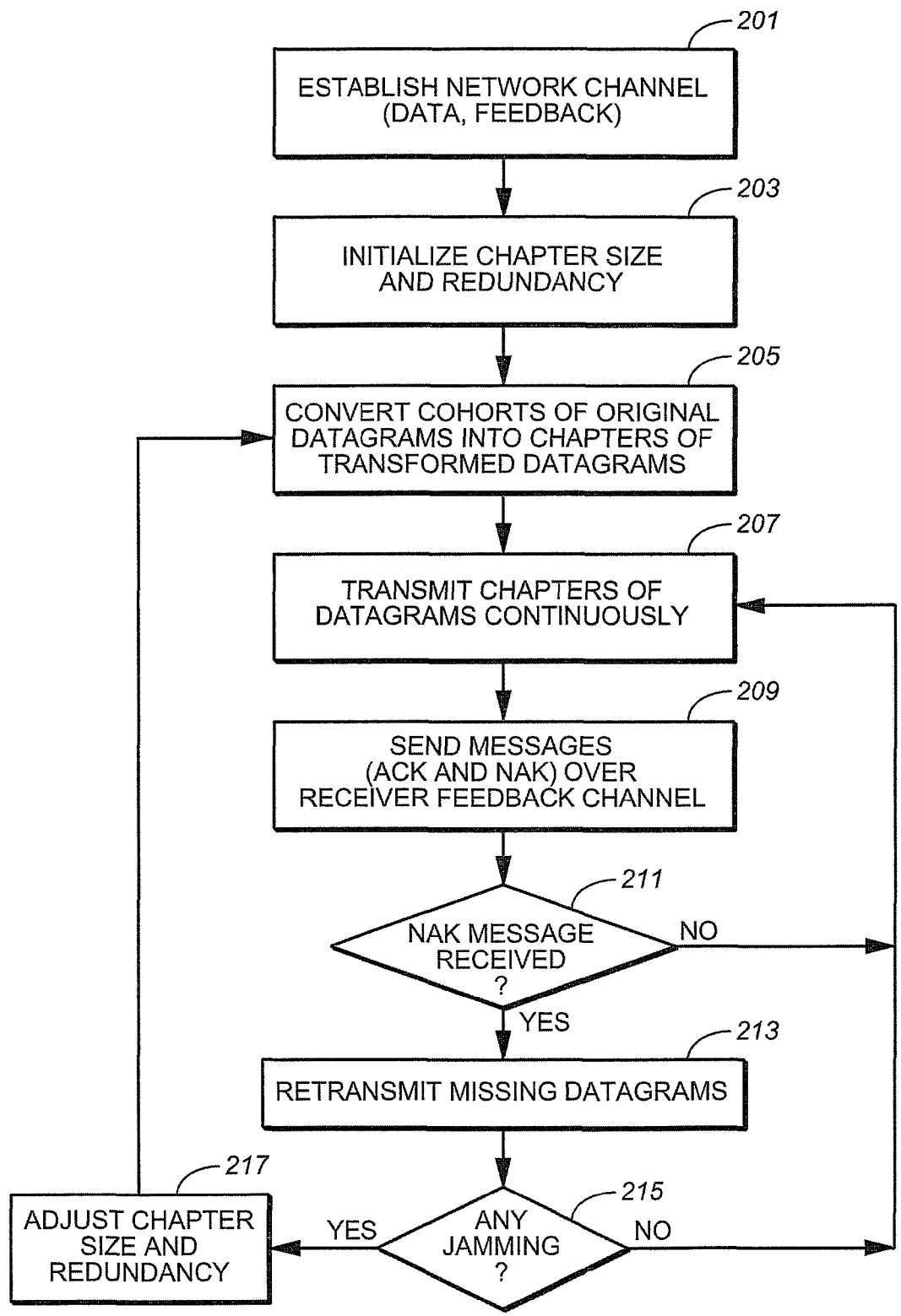
FIG. 2 is a block flow diagram illustrating steps carried out by a data transmission system in accord with the present invention.

With reference to FIG. 2, data transfer between a sender unit at a first endpoint of a datagram-based inter-network and a receiver unit at a second endpoint in the datagram-based network begins by establishing separate data and feedback channels over the network between the sender and receiver (step 201). Both sender and receiver cooperate in establishing such channels and, until such time as the data transfer session is complete, both sender and receiver units remain coupled to those established channels. Each channel comprises at least one path over the network. The chapter size and amount of redundancy is initialized (step 203) based on an first assumption of no jamming being present in the network. Only when jamming is detected or otherwise established (for example, by indications from a user) would the chapter size and redundancy be adjusted to handle such jamming.

The sender unit has a processor that divides a data set to be transmitted into cohorts of datagrams and converts each cohort of H original datagrams into corresponding chapters of W transformed datagrams, where W is greater than or equal to H (step 205). The conversion is such that a complete cohort of original datagrams will be recoverable by the receiver unit from any subset of at least H of the transformed datagrams that have been derived from that particular cohort. Thus, dropping or other loss of some datagrams during transmission will usually allow recovery of complete cohorts of datagrams in spite of that loss due to the redundancy introduced by the chosen fault-tolerant transformation. The processor operations of the both the sender and receiver unit are described in greater detail below.

The sender unit proceeds to send complete chapters of transformed datagrams over the data channel to the receiver unit until a source of data is exhausted or until paused by the receiver (step 207). The receiver unit identifies received datagrams and regularly reports successful recovery of cohorts of datagrams to the sender by means of periodic acknowledgement messages (ACKs). The receiver also identifies any missing or incomplete chapters with insufficient datagrams for cohort recovery together with a list of missing or corrupt datagrams from any such chapters and, as needed, sends negative acknowledgments (NAKs) to the sender over the established feedback channel (Step 209).

For example, one manner in which datagram transmission and receipt can be tracked involves assigning of sequence numbers to chapters and their respective datagrams according to the order in which they have been derived by the sender from source data. Periodic ACKs from the receiver report the highest consecutive sequence number for datagrams received to date and successful recovery of cohorts of original datagrams. With such ACK information, the sender unit need only retain those sent datagrams in a condition available for immediate resending that have not yet been acknowledged. Once an ACK message acknowledges successful receipt, those datagrams with sequence numbers less than or equal to the reported sequence number can be removed from a sender buffer. Datagrams not received that are part of successfully recovered cohorts can also be dropped since they won't be needed.

Likewise, sequence numbers allow a receiver to identify those datagrams that are received out of order with intervening missing datagrams, and to identify any datagrams which arrive corrupted. Whenever a cohort of original datagrams cannot be recovered from those received datagrams of a chapter, a NAK message reports the identity of the missing or incomplete chapter and the identity of missing or corrupted datagrams from that chapter. Whenever the sender determines that a NAK message has been received (step 211), the sender immediately resends at least a specified number of those datagrams identified in that NAK (step 213) that will allow recovery of the corresponding cohort. The datagrams being resent could be all transformed datagrams of the chapter, just those datagrams identified as missing or corrupt, or a subset of those missing or corrupt datagrams. The sender unit can take advantage of known datagram loss rates to resend only as many missing datagrams as will assure recovery.

The sender regularly self-tunes the sending rate in reaction to changing network conditions. Such self-tuning is based upon a combination of factors, including network latency and datagram loss rate (to maximize use of available bandwidth). Data loss rate is one factor in identifying the existence and degree of jamming that may be present in the network. These factors are determined from the content of the messages received over the receiver feedback channel. Thus, network latency may be determined from timing information reported back on periodic SYN messages or in ACK messages. (For example, sent datagrams may have a sender timestamp and their arrival time recorded by the receiver. Changes in the time difference can then be reported. Alternatively, if the feedback channel uses the same network pathway as the data channel, the SYN and ACK messages themselves may be time-stamped.) Datagram loss rate from any source can be determined from arriving NAK messages. The sender's self-tuning of the data send rate is adapted to at least keep a datagram loss rate below a specified upper bound.

The sender unit uses the information obtained from feedback messages (ACK and NAK) to identify jamming (step 215). Also, since jamming may affect the receipt of feedback messages over the established feedback channel, timeouts on the receipt of ACK messages may be used as indication of datagram losses. The sender unit may also accept user input on the existence of jamming. Once jamming has been identified, the sender unit adjusts the chapter size and/or amount of redundancy based on the existence of such jamming and/or the degree of jamming, as determined by datagram loss rates or assumed loss rates from timeouts (step 217). Such changes in chapter size and/or redundancy are communicated to the receiver unit.

Each chapter contains a header data structure which describes the chapter. It includes the chapter number, the chapter's hash or checksum and the number of bytes in the chapter to be recovered (in the case of end-of-file). There can also be a field for indicating the number of datagrams in a chapter. By means of this header information, the sender unit can let the receiver unit know the chapter size and redundancy level. Alternatively, it would be possible to send an explicit message stating that the number n of datagrams for chapters starting with chapter number c. A second alternative would be to send an acknowledgement message with per-chapter lengths encoded in various ways. However, use of the header data structure is the preferred method. In order to enable decoding by the receiver, header structure is attached to the datagrams of a chapter after they have been encoded so that information needed to guide the recovery of a chapter is immediately available to the receiver. When the size and redundancy of the chapters are dynamically altered according to changing network conditions, including jamming, each chapter's header contains the required information for recovery of that particular chapter. In an alternative, when the information is not provided in a given chapter, chapter size and redundancy are assumed by the receiver to be unchanged from a previous chapter.

Error-Correction Coding and Recovery.

The sender unit includes a processor that carries out the required transformation of a cohort datagrams into a fault-tolerant form. In particular, a cohort of H original datagrams is converted into a corresponding chapter of W transformed datagrams, where the original cohort can be recovered from any subset of H transformed datagrams from the corresponding chapter. The transformation may be Reed-Solomon coding, or can be some other fault-tolerant coding that introduces sufficient redundancy of information into the transformed datagrams to permit recovery of original datagrams. One such procedure is described in U.S. Pat. No. 8,078,944 to Cousins. Other fault-tolerant transformations could also be used.

What is claimed is:

1. A method of transferring data between a sender and a receiver in a datagram-based network with lossless overall transfer even when jamming conditions are present, comprising:

establishing separate data and feedback channels over the network between the sender and receiver;

dividing a data set to be transmitted into cohorts of datagrams and converting each cohort of H original datagrams into corresponding chapters of W transformed datagrams, where W is greater than or equal to H, the conversion being such that a complete cohort of original datagrams is recoverable from any subset of at least H of the transformed datagrams that have been derived from that cohort;

sending chapters of transformed datagrams over the data channel from the sender to the receiver until a source of data is exhausted or paused by the receiver;

sending messages over the feedback channel from the receiver to the sender acknowledging that cohorts of original datagrams have been successfully recovered, and identifying any missing or incomplete chapters with insufficient datagrams for cohort recovery together with a list of missing or corrupt datagrams from any such chapters, the messages further including timing information indicative of network latency and congestion;

resending over the data channel at least a specified number of datagrams from the list for a missing or incomplete chapter which will be sufficient to allow cohort recovery; and self-tuning by the sender of any one or more of the sending rate, chapter size W and redundancy W/H in reaction to changing network conditions based upon a combination of recognition of a jamming condition, network latency and datagram loss rate as determined from the content of the messages received over the receiver feedback channel, the self-tuning adapted to at least keep a datagram loss rate below a specified upper bound, a jamming condition being identified from any combination of one or more of user input to the sender, timeout on the receipt of messages over the feedback channel, timing information in the messages indicating round-trip transmission times longer than a specified period, and messages indicating missing, incomplete or corrupt datagrams in excess of a specified rate.

2. The method as in claim 1, wherein each datagram includes an assigned sequence number indicating an order in which it has been derived from source data, the messages from the receiver including periodic acknowledgements (ACKs) reporting the highest consecutive sequence number of datagrams successfully received to date.

3. The method as in claim 2, wherein the messages from the receiver further include, whenever a datagram is received out of sequence or is corrupt, corresponding negative acknowledgements (NAKs) notifying the sender of sequence numbers of missing or corrupt datagrams not yet successfully received.

4. A system of transferring data between a sender at a first endpoint and a receiver at a second endpoint in a datagram-based inter-network with lossless overall transfer even when jamming conditions are present, the system comprising:

a processor implementing fault-tolerant coding of datagrams, the processor dividing a data set to be transmitted into cohorts of datagrams and converting each cohort of H original datagrams into corresponding chapters of W transformed datagrams, where W is greater than or equal to H, the conversion being such that a complete cohort of original datagrams is recoverable from any subset of at least H of the transformed datagrams that have been derived from that cohort;

a data channel configured to transmit chapters of transformed datagrams over at least one path of the inter-network;

a feedback channel separate from the data channel and configured to transmit messages over the inter-network, the messages including acknowledgement messages (ACKs) that acknowledge successful recovery of cohorts of original datagrams and also including negative acknowledgements (NAKs) that identify any missing or incomplete chapters with insufficient datagrams for cohort recovery together with a list of missing or corrupt datagrams from any such chapters, at least some messages periodically including timing information indicative of network latency and congestion;

a sender unit coupled to the data channel and the feedback channel, the sender configured to establish the respective channels, send chapters of transformed datagrams over the data channel to the receiver until a source of data is exhausted or paused by a receiver unit, and resend at least a specified number of datagrams from the list included in any NAK message for a missing or incomplete chapter which will be sufficient to allow cohort recovery, the sender unit configured to self-tune the sending rate of chapters of datagrams, chapter size W and redundancy Will in reaction to changing network conditions to optimize throughput based upon a combination of recognition of a jamming condition, network latency and datagram loss rate as determined from the content of the messages received over the receiver feedback channel, a jamming condition being identified from any combination of one or more of user input to the sender unit, timeout on the receipt of messages over the feedback channel, timing information in the messages indicating round-trip transmission times longer than a specified period, and messages indicating missing, incomplete or corrupt datagrams in excess of a specified rate, the self-tuning adapted to at least keep a datagram loss rate below a specified upper bound; and a receiver unit coupled to the data channel and the feedback channel, the receiver configured to establish the respective channels with the sender unit, to receive transformed datagrams over the data channel, recover cohorts of original datagrams from the received datagrams of corresponding chapters, send both ACK messages at predetermined intervals and NAK messages as needed to the sender over the feedback channel.

5. The system as in claim 4, wherein each datagram includes an assigned sequence number indicating an order in which it has been derived from, source data, the periodic acknowledgement messages (ACKs) from the receiver unit reporting the highest consecutive sequence number of datagrams successfully received to date, the sender unit configured to track sent datagrams and to retain the sent datagrams available for resending until acknowledged by an ACK message.

6. The system as in claim 5, wherein the messages from the receiver unit further include, whenever a datagram is received out of sequence or is corrupt, corresponding negative acknowledgements (NAKs) notifying the sender unit of sequence numbers of missing or corrupt datagrams not yet successfully received, the sender unit configured to resend, as part of one or more chunks, those datagrams that have been identified by a NAK.

* * * * *